March 12, 1940.  W. B. CLELAND  2,193,475

MECHANICAL ADVERTISING DEVICE

Filed Nov. 19, 1937  5 Sheets-Sheet 1

INVENTOR
William Brown Cleland
BY
E. J. Fetherstonhaugh
ATTORNEY

March 12, 1940.  W. B. CLELAND  2,193,475
MECHANICAL ADVERTISING DEVICE
Filed Nov. 19, 1937   5 Sheets-Sheet 3

Inventor.
W. B. Cleland.
By E. J. Fethastonhaugh
Attorney.

March 12, 1940. W. B. CLELAND 2,193,475
MECHANICAL ADVERTISING DEVICE
Filed Nov. 19, 1937 5 Sheets-Sheet 4

Inventor:
W. B. Cleland
By E. J. Fetherstonhaugh
Attorney.

March 12, 1940.  W. B. CLELAND  2,193,475
MECHANICAL ADVERTISING DEVICE
Filed Nov. 19, 1937   5 Sheets-Sheet 5

Inventor:
W. B. Cleland
By E. J. Fetherstonhaugh
Attorney.

Patented Mar. 12, 1940

2,193,475

UNITED STATES PATENT OFFICE 2,193,475

MECHANICAL ADVERTISING DEVICE

William Brown Cleland, Troy, Ontario, Canada, assignor to Joseph E. Seagram & Sons Limited, Waterloo, Ontario, Canada Application November 19, 1937, Serial No. 175,498

1 Claim. (Cl. 40—126)

The invention relates to a mechanical advertising device, as described in the present specification and illustrated in the accompanying drawings that form part of the same.

The invention consists essentially in timing the motion of certain figures so that they keep in synchronism with the movements of certain pieces of mechanism initiated by the hand or hands of the time piece reaching a predetermined and definite destination, as described in detail in the following specification and pointed out in the claim for novelty forming part thereof.

The objects of the invention are, in the present invention, to announce to the public a special feature connected pointedly to the history of the company advertising and bound to reflect favorably on the progress and success of that company through indirect reference to accomplishments in the past and may be in the future, such as horseracing which is indelibly associated with the former owner and his name in the world of sport and production, seeing that the name of the founder was for many years and is still deeply rooted in the memories of all people having an interest either for pleasure or otherwise in horses, their breeding and accomplishments; to devise a mechanism that will picture with great accuracy an event in the racing calendar constantly recurring at true intervals so that the bystanders' conception of the event will be well established as belonging to an industrial product in some shape or another; to maintain this operation in picturesque form for the average person to enjoy largely, and at the same time associate in the mind of the watcher that product with racing, and naturally invite inquiry and comparison amongst the newcomers as to the origin of the symbolic representation, and thereby liken the progress of the company to the accomplishments of its founder as well as refer incidently to the excellence of the goods; and generally to produce a machine that the public may enjoy and be attracted to also with the name of the product constantly before them.

In the drawings hereto attached;

Like numerals of reference indicate corresponding parts in the various figures.

Figure 1:
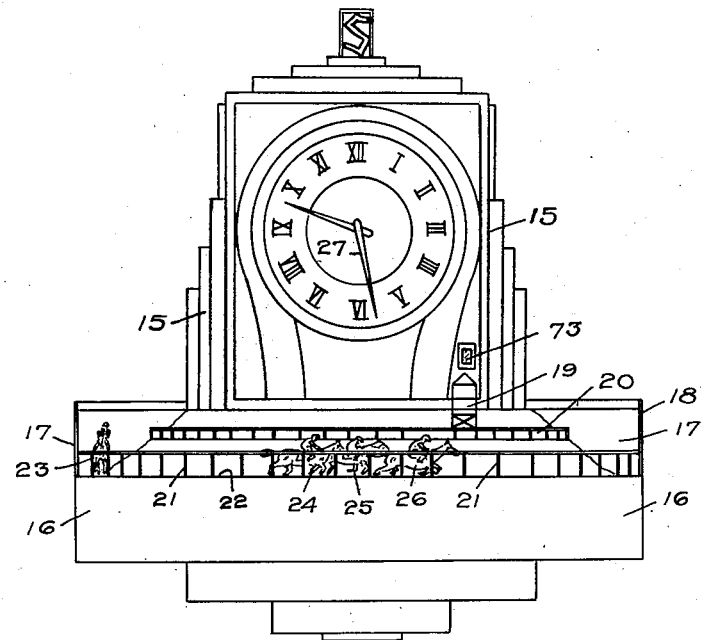
Figure 1 is an elevational view of the complete device showing a race course and running horses stretching across the face of the clock which is here shown as picturing the invention as used.

Referring to the drawings, the clock casing 15 is preferably made up of an ornamental design suitable to the type of advertising having a base 16 supporting the representation of the racetrack 17. The race track structure includes a judges' stand 19, an inner rail 20, and an outer rail 21 on either side of the running surface 22. The structure of the rack-track is circular and surrounds the clock casing, though the judges' stand and the dummy horses 23, 24, 25, and 26 are suspended over this track in their several positions, and the mechanism for running these horses is enclosed within said structure, while the works of the clock are enclosed in the clock casing, quite apart from the horse running mechanism, though this clock, in particular its minute hand 27 forms the switch for closing the electric circuit operating the electric motor 28, which is enclosed in said rack-track structure and electrically connected to the switch contacts 29 that co-act with the contacts 30 in closing the circuit.

It is presumed for the sake of clearness and understanding of the invention, that the race of these horses begins periodically, say every 15 minutes, so that each time that the minute hand reaches the end of the quarter period, a race will begin, consequently, the dummy horses, which are each suspended from the rails 32, 33, 34, and 35, rotate in a circular path on the rails of the race-track 17. The vertical shaft 36 is stationary and has the sleeve shaft which has the gear 37 co-acting with the gear 38 of the auxiliary shaft 39, and the gears 40, 41, 42 and 43 on the shaft 39 are of different diameters and co-act with the gears 44, 45, 46 and 47 on the shaft 48.

The cams 49, 50, 51 and 52 are on the same shaft 48, and the rollers 53, 54, 55 and 56 attached to arms 32—35 respectively move on these cams, which are of different shapes and turn the rails 32, 33, 34 and 35 about the hollow shaft 57, and each rail will move at a different speed according to the shape of the cam. The shaft 57 has the arms 83 and 84 which are connected to the shafts 39 and 48 for the purpose of rotating the rails and the accompanying gears 40, 41, 42 and 43 which co-act with the gears 44, 45, 46 and 47, and also the cams 49, 50, 51 and 52. In other words, by the rotation of the vertical shaft 57, the whole mechanism, that is to say the rails and the shafts 39 and 48 with the accompanying gears and cams are swung around in an arcuate direction.

The motor 28 is connected to the shaft by a worm connection 59 working on the gear 60 having the ratchet wheel 61, which is operated by the pawl 62. The impulse from the master clock goes through the wiring 63 to the magnet 64, which brings the arm 64a of the pawl 62 into the latch 65, which is the horse line-up or starting position.

Figure 5:
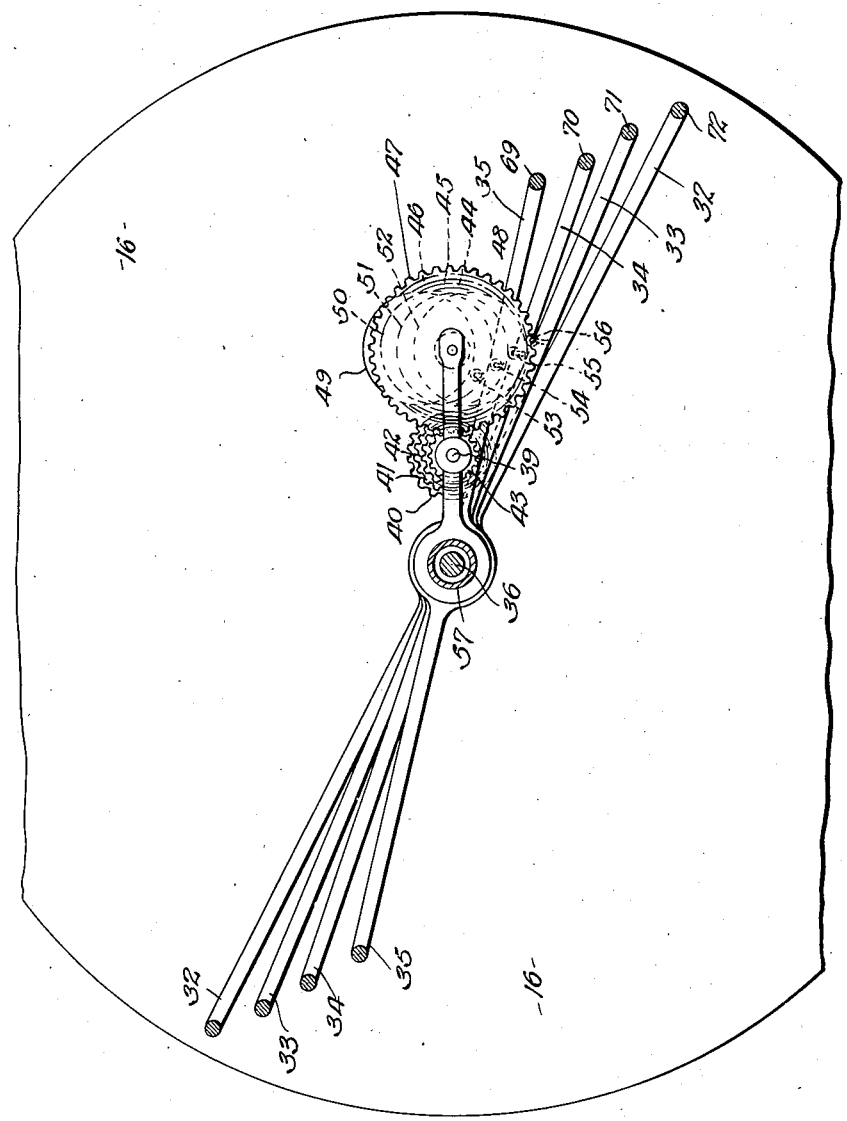
Figure 5 is an enlarged sectional plan view on the line 5—5 in Figure 3.
Figure 6:
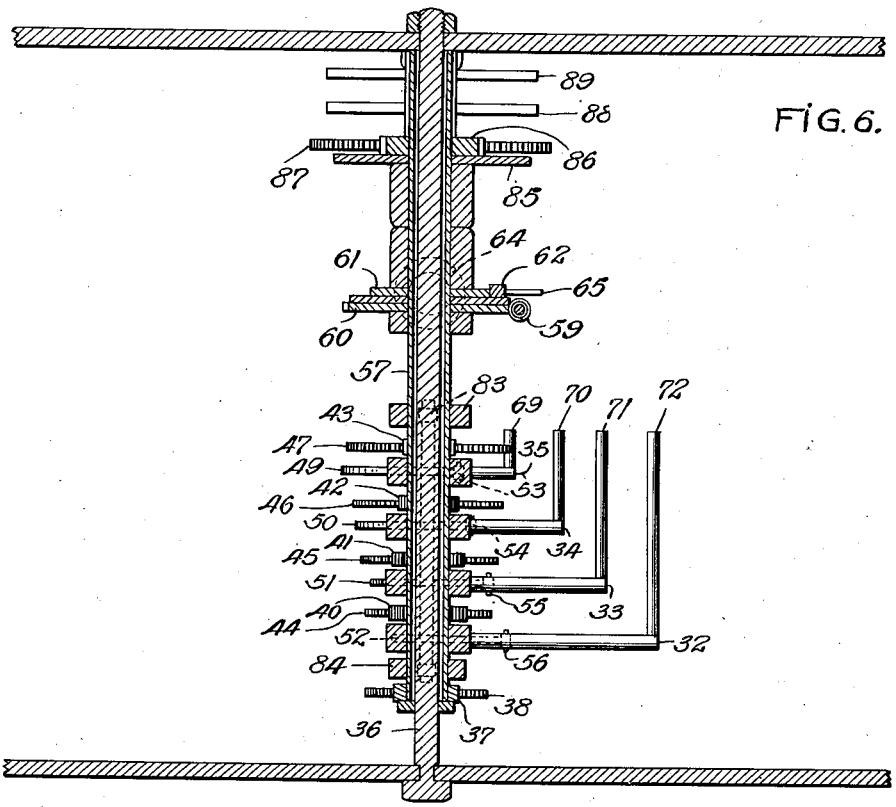
Figure 6 is a vertical sectional view as taken on the line 6—6 in Figure 3.
Figure 7:
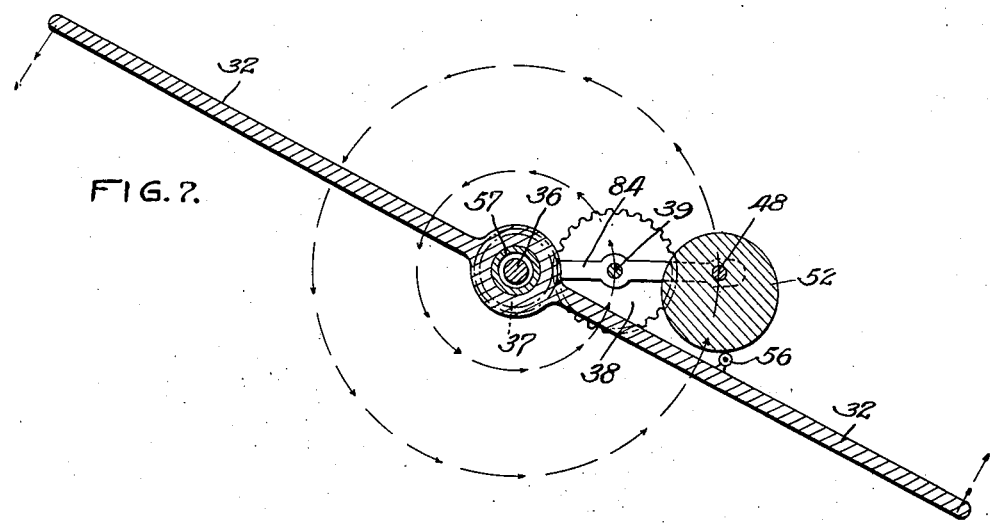
Figure 7 is a longitudinal sectional view as taken on the line 7—7 in Figure 3.

Figure 5 shows the rails 32, 33, 34 and 35 with the rollers 53, 54, 55 and 56 attached thereto, and these rollers engage the cams 49, 50, 51 and 52, which are of different shapes; as the rails are turning on the hollow shaft 57 and coacting with the cams, each rail will move at a different speed according to the shape of the cam.

An impulse is sent out momentarily by a contact in the master clock over the wires 30. This energizes the magnet 64a thereby closing the circuit for motor 28 and auxiliary motor 66, and upon operation of the driving motor 28, the ratchet wheel 61 commences to revolve, leaving the pawl 62 in a stationary position, and at the same time the operation of the auxiliary motor 66 driving the timing contact 67, will close the circuit controlling magnet 64 momentarily, and the energizing of the magnet 64 raises the armature 65, permitting the pawl 62 to energize the ratchet wheel 61 advancing the ratchet wheel and the pawl 62 on to a second tooth of the armature 64, (the impulse from the timing disc 67 being only momentarily, which releases the pawl sufficient only to release the first tooth and energize the second tooth, thereby declutching the ratchet wheel).

The movement of the ratchet wheel drives the shaft 57 a very short distance sufficient for the arms upon which the race horses are fixed to encounter and be obstructed from further motion by the armature of the coil 68. The movement of the shaft 57 also advances the jack shaft or auxiliary shaft upon which the eccentric cams are mounted, causing the arms 69 to 72 to be in perfect alignment and being held by the armature 68.

The auxiliary motor 66 still being in motion, a period of about three to five seconds has elapsed, and a second contact will go through from the contacting disc 67 causing the magnet 64 and the magnet 68 to operate simultaneously. The respective magnets release the pawl 62 and engage the ratchet wheel 61 causing the shaft 57 to revolve, and at the same time, the magnet 68 has been energized and releasing the horses from what is termed the "line up position", they all start on "scratch". Upon the shaft 57 is mounted a gear 86, which has a four to one ratio to the gear 87, timing discs are mounted on these gears which keep the magnets 64 and 68 energized, allowing the horses to revolve around the track four times before the magnets 64 and 68 are released. Upon completion of the four revolution cycles, all the timing discs break contact, stopping the motors and disengaging the pawl from the ratchet wheel 61.

The purpose of the magnet 68 as previously described is to bring the horses from the staggered position that they were in at the finish of the last race, lining them up to a common starting point, and by the action of the jack shaft 39 revolving around the common centre shaft housing, it revolves at a uniform speed. The horses, however, are arranged to take a lead or fall behind the other horses due to the fact that eccentric cams and the individual gears either advance or are retarded from the normal regular speed of the jack shaft 39, giving the fact of one horse overtaking or falling behind the other horses.

Figure 2:
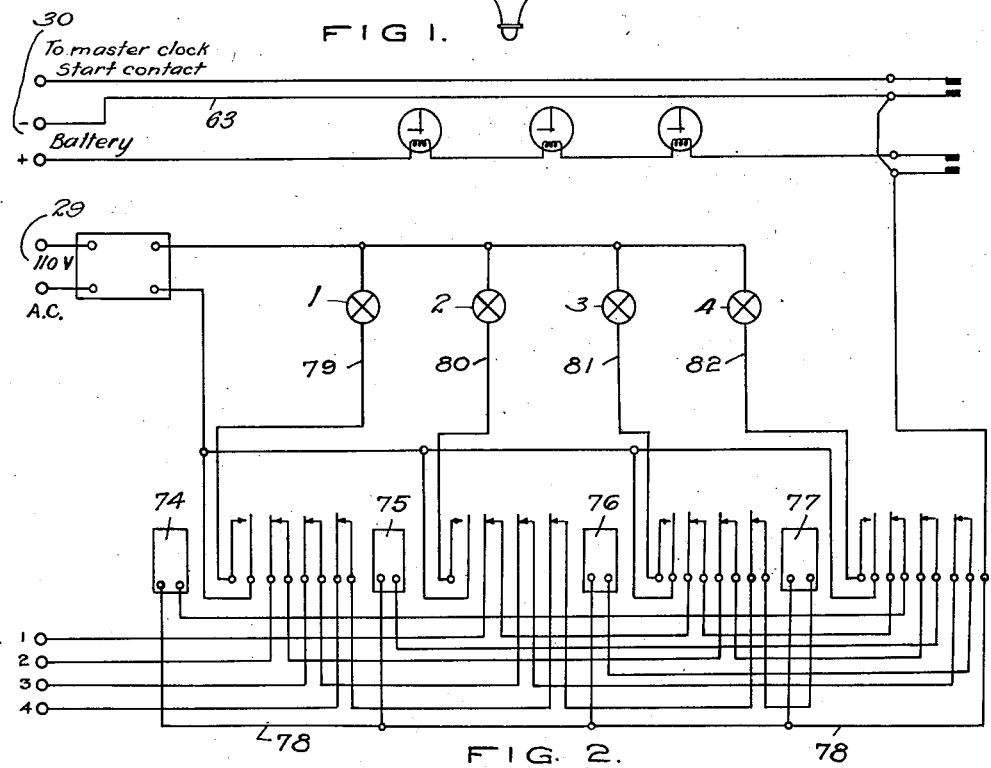
Figure 2 shows the electrical connections for the device.
Figure 3:
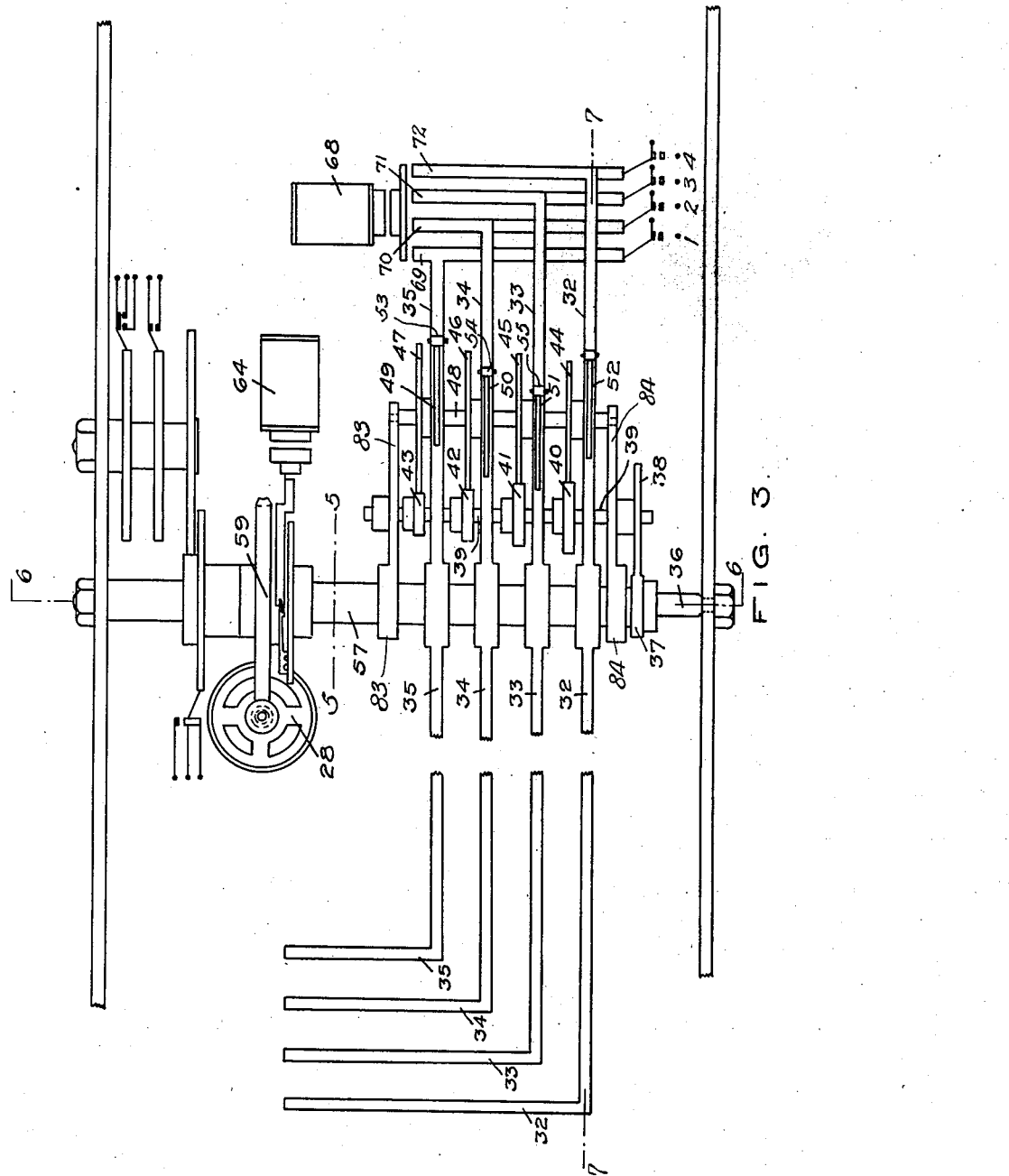
Figure 3 is an elevational view of the operating gears and power unit.
Figure 4:
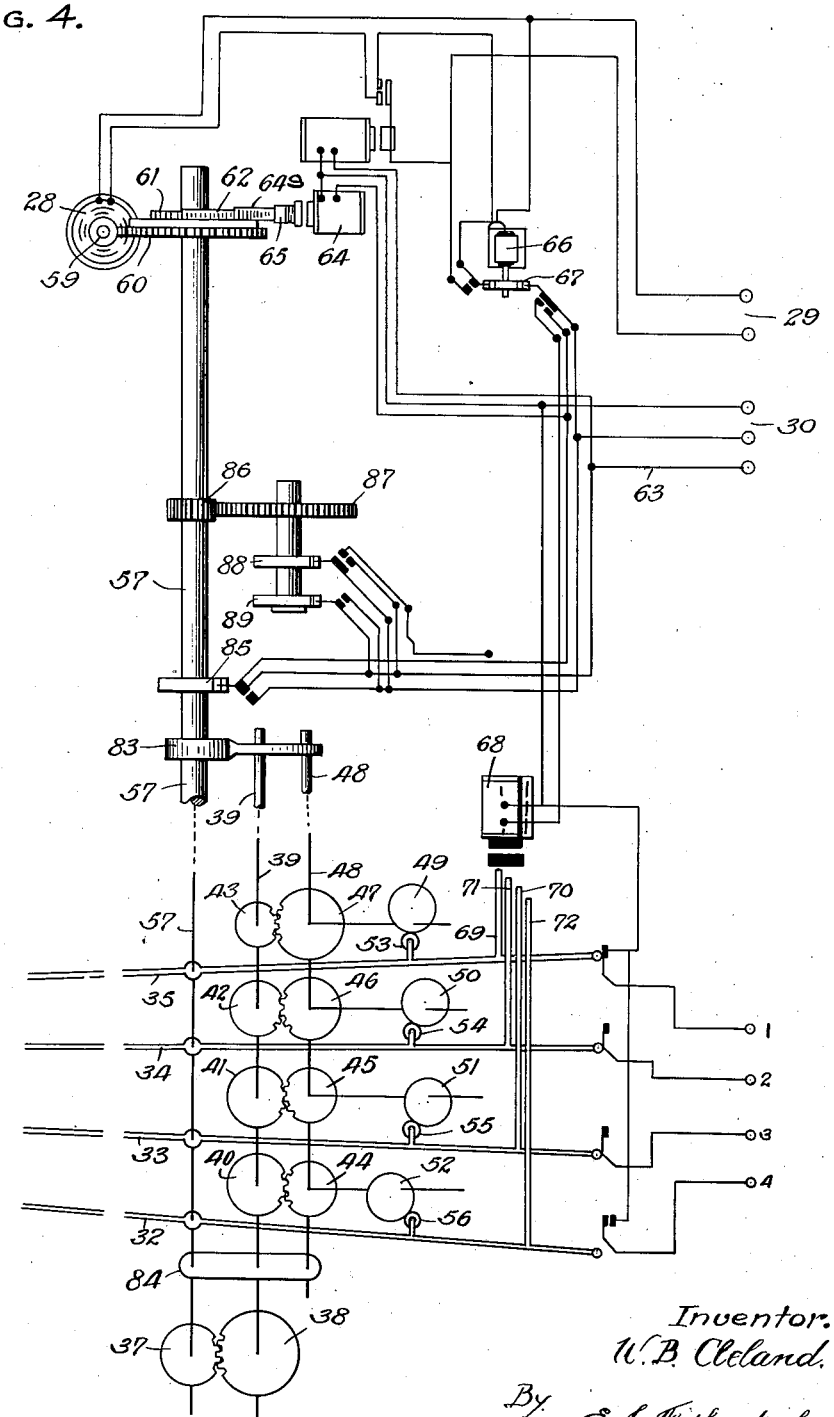
Figure 4 is a diagrammatical view of the gears and other mechanical parts shown in Figure 3.

At the end of the complete cycle of four revolutions around the track, the particular horse that has been favored by the advanced motion of the cam combined with the individual play gear ratio, it will arrive at the finish line ahead of all the other horses. A contact device is illustrated in Figure 2, the wires marked 1, 2, 3, and 4, correspond to the respective arms 71 to 74, a contact being made on any one of these wires operates its respective relay 74 to 77, and any one of these relays operating automatically isolate the circuits from the other three ralays permitting its energziation. The operation of any particular relay will illuminate the corresponding lamp 79 to 82, all the said lamps are incorporated in the judges' stand 19 in Figure 2. The said lamp remains illuminated during the interval between the finish of the race and the commencement of another race, showing the winner of the previous race.

The operation is initiated by the minute hand of the clock mechanism, which in itself comprises a switch to energize an electric motor, and the shaft of this motor is thus rotated, and the rotation thereof sets the gear mechanism in motion. The construction and setting of these gears is such that on the stoppage thereof, it coincides exactly with the stoppage of the electric motor, and leaves the dummy figures in a position they have reached at the time of that stoppage, and while this shall vary, it depends largely on the construction of the variable gear mechanism and their connections to the sleeves encircling the rails.

It is not intended that the gear wheels shall be definitely in the same place at all times, because they are so constructed as to be in various different positions, and influenced by the cams and rollers, which are along a certain slip, and no one knows which horse will benefit by that slip. These cams are the stepping members co-operating with the electro-magnet and the accompanying rollers, which, as explained, interfere in the stoppage of the horses to the extent of that uncertainty that is so desirable in a game of this sort, and immediately the winner is determined by this stoppage, consequently the bystander sees his horse win, and if he is backing his horse, then he wins, with the result that the game is an innocent and lawful amusement for the public at large. The actual and consecutive operation of these many pieces is explained in the description of the details, as it would prove cumbersome to anyone without this general description, as each part has been shown clearly in the drawings, and is fully explained, with also a clear description of the electric wiring for the score board and its objects and operations.

What I claim is:

A mechanical advertising device comprising a clock casing, a clock mechanism in said casing, a track structure forming a base for said clock casing and encircling the same, a plurality of dummy horses movable on said track structure, a motor and electric circuit introduced in said structure and adapted to be energized through the movement of the said clock mechanism, a vertical shaft having a pawl and ratchet mechanism operated by said motor, a plurality of arms loosely mounted on said vertical shaft, auxiliary shafts operated by the said vertical shaft and having intermediate gears of varying diameters, a plurality of varied shaped cams secured to the gears of each of said auxiliary shafts, rollers secured to said arms and adapted to be spring held into contact with said cams, said arms being secured to said dummy horses, electrical means for bringing said arms into alignment with one another, and electrical means for shutting off the movements of said arms at predetermined periods, said clock mechanism adapted to control the energization of the circuit at predetermined periods.

W. B. CLELAND.